United States Patent
Marrocco et al.

(10) Patent No.: US 7,089,826 B2
(45) Date of Patent: Aug. 15, 2006

(54) AUTOMATIC TOOL ATTACHMENT APPARATUS

(75) Inventors: Al Marrocco, Windsor (CA); Darrell Sheppy, Windsor (CA)

(73) Assignee: Ford Motor Company, Dearborn, MI (US)

( * ) Notice: Subject to any disclaimer, the term of this patent is extended or adjusted under 35 U.S.C. 154(b) by 141 days.

(21) Appl. No.: 10/710,291

(22) Filed: Jun. 30, 2004

(65) Prior Publication Data

US 2005/0005742 A1    Jan. 13, 2005

Related U.S. Application Data

(60) Provisional application No. 60/485,666, filed on Jul. 9, 2003.

(51) Int. Cl.
  *B25B 21/00* (2006.01)
  *B25G 3/04* (2006.01)

(52) U.S. Cl. .................................... 81/54; 81/177.85

(58) Field of Classification Search ............ 81/54, 81/176.15, 177.85; 403/7, 183, 184, 299, 403/361
See application file for complete search history.

(56) References Cited

U.S. PATENT DOCUMENTS

| | | | |
|---|---|---|---|
| 1,952,996 A * | 3/1934 | Landgraf | 403/47 |
| 2,714,026 A * | 7/1955 | Schultz | 403/183 |
| 3,021,160 A * | 2/1962 | Hooks | 403/182 |
| 3,586,115 A | 6/1971 | Amtsberg | |
| 3,623,557 A | 11/1971 | Allen | |
| 3,722,363 A | 3/1973 | Hague et al. | |
| 3,758,938 A | 9/1973 | Simmons et al. | |
| 3,818,797 A | 6/1974 | Zettler | |
| 3,843,143 A * | 10/1974 | Laxson | 279/144 |
| 4,117,586 A | 10/1978 | Uchida et al. | |
| 4,221,043 A | 9/1980 | Dailey | |
| 4,306,350 A | 12/1981 | Kielma et al. | |
| 4,844,671 A | 7/1989 | Reinauer | |
| 4,869,136 A | 9/1989 | Easter et al. | |
| 5,282,638 A * | 2/1994 | Harper | 279/144 |
| 5,291,645 A | 3/1994 | Aoyama | |
| 5,361,656 A * | 11/1994 | Starr | 81/180.1 |
| 5,509,333 A * | 4/1996 | Rion | 81/180.1 |
| 5,755,448 A | 5/1998 | Kanaan et al. | |
| 6,247,999 B1 | 6/2001 | Tokiwa | |
| 6,659,997 B1 * | 12/2003 | Casutt | 606/1 |

OTHER PUBLICATIONS

Robots for Flexible Torquing, www.assemblymag.com Apr. 2002, pp. 38–40.

* cited by examiner

*Primary Examiner*—David B. Thomas
(74) *Attorney, Agent, or Firm*—Raymond L. Coppiellie; Brooks & Kushman, P.C.

(57) ABSTRACT

An apparatus for automatically coupling a tool to a manipulator having a spindle. The apparatus includes a first adapter and a second adapter. The first adapter includes a spindle mating portion and a first threaded portion. The second adapter includes a second threaded portion adapted to engage the first threaded portion and a tool mating portion adapted to engage the tool.

20 Claims, 1 Drawing Sheet

AUTOMATIC TOOL ATTACHMENT APPARATUS

CROSS REFERENCE TO RELATED APPLICATIONS

This application claims the benefit of U.S. provisional application Ser. No. 60/485,666 filed Jul. 9, 2003.

BACKGROUND OF INVENTION

1. Field of the Invention

The present invention relates to an apparatus for automatically coupling a tool to a manipulator, such as a multi-axis robot.

2. Background Art

An automated collet-based tool for holding a threaded fastener is known in the automated fastener tool art, such as that described in U.S. Pat. No. 4,869,136.

SUMMARY OF INVENTION

According to one aspect of the present invention, an apparatus for automatically coupling a tool to a manipulator having a spindle is provided. The apparatus includes a first adapter and a second adapter. The first adapter has a spindle mating portion adapted to be coupled to the spindle and a first threaded portion disposed opposite the spindle mating portion. The second adapter has a second threaded portion adapted to engage the first threaded portion and a tool mating portion adapted to engage the tool disposed opposite the second threaded portion. The first and second threaded portions may have male or female configurations.

The apparatus may include a tool magazine having a tubular portion and a raised portion. The tubular portion may be adapted to receive the tool. The raised portion may be disposed in the tubular portion and may be adapted to engage the tool to inhibit rotation when the manipulator rotates the first adapter with respect to the second adapter. The tubular portion may include a proximity sensor that detects presence of the tool.

According to another aspect of the invention, an apparatus for automatically coupling a fastener tool to a multi-axis robot having a spindle is provided. The spindle is adapted to rotate about an axis of rotation and has a drive portion. The apparatus includes a first adapter and a second adapter. The first adapter has a spindle mating portion adapted to engage the drive portion and a first threaded portion disposed opposite the spindle mating portion. The second adapter has a second threaded portion adapted to engage the first threaded portion and a tool mating portion adapted to engage the fastener tool disposed opposite the second threaded portion. The spindle rotates about the axis of rotation in a first direction to engage the first and second threaded portions and rotates in an opposite direction to disengage the first and second threaded portions.

The drive portion may include a retaining feature adapted to engage the spindle mating portion to secure the first adapter to the spindle and inhibit movement of the first adapter along the axis of rotation.

The fastener tool may include a first opening adapted to receive the tool mating portion and a second opening disposed coaxially with the first opening that is configured to engage a fastener. The tool mating portion may also include a tool retention feature protruding from a surface of the tool mating portion that is adapted to engage the first opening to secure the fastener tool to the tool mating portion and inhibit movement of the fastener tool along the axis of rotation.

The apparatus may include a tool magazine having a tubular portion that includes a bottom surface and a raised portion. The tubular portion may be adapted to receive the fastener tool. The raised portion may be disposed in the tubular portion proximate the bottom surface. The raised portion may be adapted to extend into the second opening to inhibit rotation of the fastener tool when the multi-axis robot rotates the first adapter about the axis of rotation to engage or disengage the first and second threaded portions. The tool magazine may include a proximity sensor disposed proximate the tubular portion that is adapted to detect the presence of the fastener tool and provide a tool detection signal to the multi-axis robot.

According to another aspect of the present invention, an apparatus for automatically coupling a socket to a spindle disposed on a multi-axis robot is provided. The spindle is adapted to rotate about an axis of rotation and includes a drive portion. The apparatus includes a first adapter, a second adapter, and a socket magazine. The first adapter includes a body portion and a first threaded portion. The body portion has a spindle mating opening adapted to receive the drive portion. The first threaded portion is provided on the body portion and is coaxial with the axis of rotation. The second adapter includes a main portion, a second threaded portion, and a socket mating portion. The main portion has a first surface and a second surface disposed opposite the first surface. The second threaded portion is oriented to engage the first threaded portion and is disposed on the first surface coaxially with the axis of rotation. The socket mating portion is oriented to engage the socket and is disposed on the second surface coaxially with the axis of rotation. The socket magazine includes a cylindrical tubular portion and a surface feature. The cylindrical tubular portion has an opening for receiving the socket and a bottom surface. The surface feature is provided on the bottom surface for engaging the socket to inhibit rotation. The first threaded portion engages the second threaded portion when the spindle rotates about the axis of rotation in a first direction and disengages when the spindle rotates about the axis of rotation in an opposite direction when the socket is disposed in the socket magazine proximate the surface feature.

The body portion may have a larger diameter than the first threaded portion to inhibit tilting of the first adapter with respect to the spindle.

The main portion may have a larger diameter than the socket mating portion to inhibit tilting of the socket with respect to the main portion.

DETAILED DESCRIPTION

Figure 1:
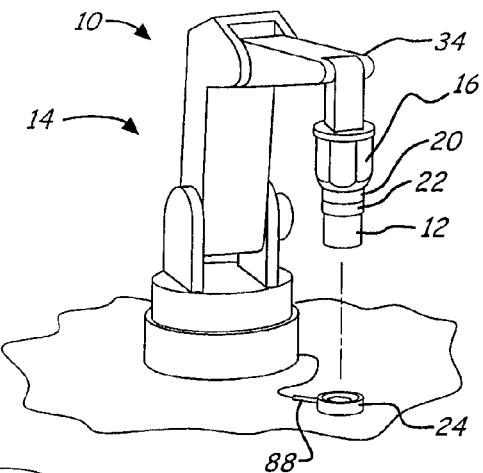
FIG. 1 is a perspective view of a multi-axis robot having an automatic tool attachment apparatus.

Referring to FIG. 1, an automatic tool attachment apparatus 10 is shown. The automatic tool attachment apparatus 10 is adapted to allow automatic coupling of a tool 12 to a manipulator 14 having a spindle 16. The automatic tool attachment apparatus 10 may include a first adapter 20, a second adapter 22, and a tool magazine 24.

The tool 12 may be of any suitable type, such as a drill, tap, or fastener engagement tool like a socket or screw driver. The tool 12 may have a male or female configuration. In the embodiment shown in FIG. 2, the tool 12 includes a first opening 30 adapted to engage the second adapter 22 and a second opening 32 adapted to engage a fastener. Moreover, the tool 12 may have any suitable shape for engaging a fastener or workpiece, such as slotted, Phillips, pozidriv, square, tri-wing, TORX®, hex, spanner, penta-drive, qua-drex, spline, tri-groove, triangular, or oval.

The manipulator 14 may have any suitable configuration. In the embodiment shown in FIG. 1, the manipulator 14 is configured as a multi-axis robot, such as a six-axis robot, having a manipulator arm 34. However, the manipulator 14 may have any suitable number of movement axes and degrees of freedom.

The spindle 16 is disposed on the manipulator 14 and is adapted to rotate about an axis of rotation 40. In one embodiment, the spindle 16 is attached to a manipulator arm 34 in any suitable manner, such as with one or more fasteners. The spindle 16 may be of any suitable type, such as an Atlas Copco 12 volt DC bi-directional spindle. In addition, the spindle 16 may be adapted to be driven in any suitable manner, such as with a motor or pneumatics.

Figure 2:
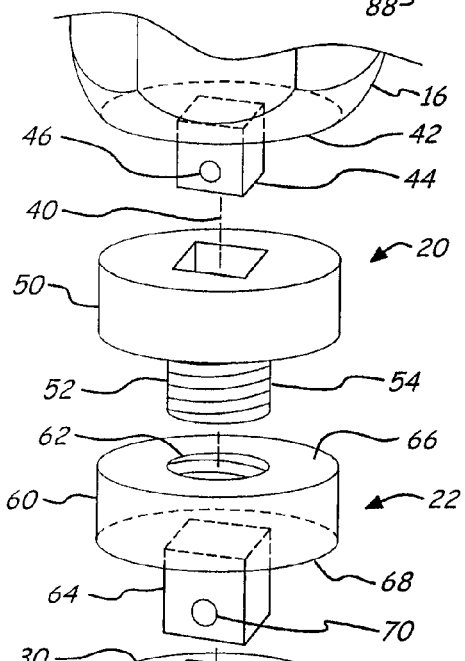
FIG. 2 is an exploded perspective view of one embodiment of the automatic tool attachment apparatus.

Referring to FIG. 2, the spindle 16 is shown in more detail. The spindle 16 may include an end surface 42 and a drive portion 44 disposed proximate the end surface 42. The drive portion 44 may have any suitable configuration. In the embodiment shown, the drive portion 44 has a male configuration and a square cross section.

The drive portion 44 may include a retaining feature 46, such as a ball bearing, dowel, or fastener, that is adapted to protrude from drive portion 44 to engage the first adapter 20 to inhibit movement of the first adapter 20 along the axis of rotation 40.

The first adapter 20 includes a spindle mating portion 50 and a first threaded portion 52. The spindle mating portion 50 is adapted to be fixedly attached to the spindle 16 in any suitable manner. The spindle mating portion 50 may have any suitable configuration. For example, the spindle mating portion 50 may have a female configuration that is adapted to receive the drive feature 44 as shown in FIG. 2. Alternately, the spindle mating portion 50 may have a male configuration that is adapted to mate with a female drive portion.

Figure 3:
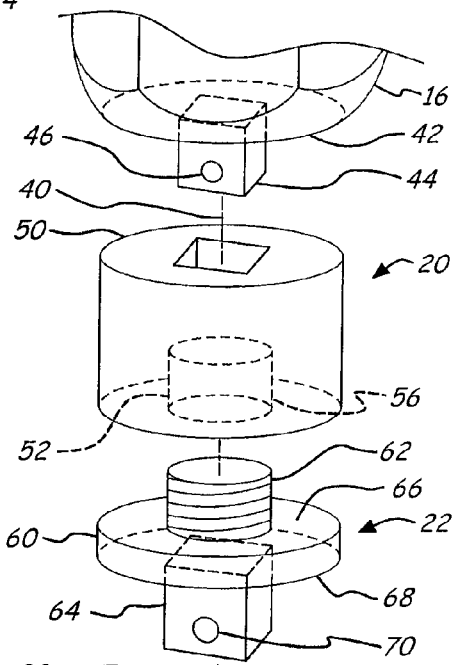
FIG. 3 is an exploded perspective view of another embodiment of the automatic tool attachment apparatus.

The first threaded portion 52 may have any suitable configuration. In the embodiment shown in FIG. 2, the first threaded portion 52 has a male configuration and includes one or more threads disposed on an outer surface 54. Alternately, the first threaded portion 52 may have a female configuration and one or more threads disposed on a inner surface 56 as shown in FIG. 3.

The second adapter 22 includes a main portion 60, a second threaded portion 62, and a tool mating portion 64.

The main portion 60 has a first surface 66 and a second surface 68 disposed opposite the first surface 66.

The second threaded portion 62 is disposed proximate the first surface 66 and is adapted to engage the first threaded portion 52. The second threaded portion 62 may have any suitable configuration. More specifically, the second threaded portion 62 may have a female configuration as shown in FIG. 2 or a male configuration as shown in FIG. 3. In addition, the second threaded portion 62 may be disposed coaxially with the first threaded portion 52 and/or the axis of rotation 40.

The tool mating portion 64 is disposed proximate the second surface 68 and is adapted to engage the tool 12. The tool mating portion 64 may have any suitable configuration. In the embodiments shown in FIGS. 2 and 3, the tool mating portion 64 has a square cross-section and is adapted to engage the first opening 30. Moreover, the tool mating portion 64 may be disposed coaxially with the axis of rotation 40.

The tool mating portion 64 may also include a retaining feature 70, such as a ball bearing, that is adapted to protrude from tool mating portion 64 to engage the first opening 30 to inhibit movement of the second adapter 22 along the axis of rotation 40 relative to the tool 12.

The tool magazine 24 is adapted to hold the tool 12 and inhibit rotation of the tool 12 about the axis of rotation 40 to facilitate automatic tool changes. The tool magazine 24 may include a tubular portion 80 and a raised portion 82.

The tubular portion 80 is adapted to receive the tool 12 and includes a wall 84 and a bottom surface 86. The tubular portion 80 and wall 84 may have any suitable configuration. In the embodiment shown in FIGS. 2 and 3, the wall 84 has a cylindrical cross-section. Moreover, the wall 84 may be spaced from the tool 12 when the tool 12 is disposed in the tool magazine 24. The tubular portion 80 may be taller than the raised portion 82 to inhibit tipping of the tool 12.

The raised portion 82 is disposed in the tubular portion 80. In the embodiment shown in FIGS. 2 and 3, the raised portion 82 is disposed proximate the bottom surface 86 and is spaced from the wall 84. The raised portion 82 may have any suitable shape adapted to engage the tool 12 to inhibit rotation. In the embodiments shown, the raised portion 82 engages the second opening 32 to hold the tool 12 and inhibit rotation when the spindle 16 rotates about the axis of rotation 40 to engage or disengage the first and second adapters 20,22.

A proximity sensor 88 may be incorporated with the tool magazine 24 to detect the presence of the tool 12. The proximity sensor 88 may be of any suitable type and may be disposed in any suitable location, such as proximate the wall 84. The proximity sensor 88 provides a detection signal to the manipulator 12 or a control unit associated with the manipulator 12 that may be used as an input for control logic that implements an adapter coupling and/or decoupling sequence.

The operation of the tool attachment apparatus 10 will now be described. To couple the first and second adapters 20,22. The manipulator 12 positions the first threaded portion 52 proximate the second threaded portion 62 such that the first and second threaded portions 52,62 are coaxially disposed with the axis of rotation 40. Next, the spindle 16 rotates the first adapter 20 in a predetermined direction to allow thread together the first and second threaded portions 52,62. In addition, the manipulator 12 may move the spindle 16 closer to the tool 12 as the first adapter 20 rotates to facilitate thread engagement. Optionally, at least a portion of the spindle 16 may be spring-loaded to facilitate thread engagement. As the first adapter 20 rotates, the second adapter 22 does not turn due to engagement with the raised portion 82 of the tool magazine 24. After a suitable number of revolutions, the first and second adapters 20,22 are mated such that the main portion 60 is disposed proximate the first adapter 20. The manipulator 12 can then remove the tool 12 from the tool magazine 24 to perform operations on a work-piece.

To decouple the first and second adapters 20,22 the process is reversed and the spindle 16 is rotated in an opposite direction to decouple the first and second adapters 20, 22.

This invention allows a manipulator to automatically couple or decouple tools to a spindle without manual intervention, thereby reducing labor costs. In addition, faster changeovers are facilitated since tools can be interchanged rapidly without stopping the manufacturing process. Furthermore, the tool attachment apparatus can be easily replicated for multiple tools. More specifically, multiple tools may be equipped with modular second adapters to allow a manipulator to automatically select from a variety of tools that may be used in a manufacturing operation.

While the best mode for carrying out the invention has been described in detail, those familiar with the art to which this invention relates will recognize various alternative designs and embodiments for practicing the invention as defined by the following claims.

The invention claimed is:

1. An apparatus for automatically coupling a tool to a manipulator having a spindle, the apparatus comprising:
a first adapter having a spindle mating portion adapted to be coupled to the spindle and a first threaded portion disposed opposite the spindle mating portion; and
a second adapter provided as a unitary component having a second threaded portion adapted to engage the first threaded portion and a tool mating portion adapted to engage the tool and disposed opposite the second threaded portion.

2. The apparatus of claim 1 wherein the manipulator is a multi-axis robot.

3. The apparatus of claim 1 wherein the first threaded portion has a male configuration and the second threaded portion has a female configuration.

4. The apparatus of claim 1 wherein the first threaded portion has a female configuration and the second threaded portion has a male configuration.

5. The apparatus of claim 1 wherein the tool mating portion has a male configuration.

6. The apparatus of claim 1 further comprising a tool magazine having a tubular portion adapted to receive the tool therein and a raised portion disposed in the tubular portion and adapted to engage the tool to inhibit rotation of the tool when the manipulator rotates the first adapter with respect to the second adapter.

7. The apparatus of claim 6 further comprising a proximity sensor disposed in the tubular portion that detects presence of the tool.

8. An apparatus for automatically coupling a fastener tool to a multi-axis robot having a spindle, the spindle being adapted to rotate about an axis of rotation and having a drive portion, the apparatus comprising:
a first adapter having a spindle mating portion adapted to engage the drive portion and a first threaded portion disposed opposite the spindle mating portion;
a second adapter provided as a unitary component having a second threaded portion adapted to engage the first threaded portion and a tool mating portion adapted to engage the fastener tool disposed opposite the second threaded portion;
wherein the spindle rotates about the axis of rotation in a first direction to engage the first and second threaded portions and rotates about the axis of rotation in an opposite direction to disengage the first and second threaded portions.

9. The apparatus of claim 8 wherein the first threaded portion has a male configuration and the second threaded portion has a female configuration.

10. The apparatus of claim 8 wherein the first threaded portion has a female configuration and the second threaded portion has a male configuration.

11. The apparatus of claim 8 wherein the drive portion further comprises a retaining feature adapted to engage the spindle mating portion to secure the first adapter to the spindle and inhibit movement of the first adapter along the axis of rotation.

12. The apparatus of claim 8 wherein the fastener tool includes a first opening adapted to receive the tool mating portion and a second opening disposed coaxially with the first opening and configured to engage a fastener.

13. The apparatus of claim 12 wherein the tool mating portion further comprises a tool retention feature protruding from a surface of the tool mating portion and adapted to engage the first opening to secure the fastener tool to the tool mating portion and inhibit movement of the fastener tool along the axis of rotation.

14. The apparatus of claim 12 further comprising a tool magazine having a tubular portion adapted to receive the fastener tool therein and a raised portion disposed in the tubular portion proximate a bottom surface, the raised portion being adapted to extend into the second opening to inhibit rotation of the fastener tool when the multi-axis robot rotates the first adapter about the axis of rotation to engage or disengage the first and second threaded portions.

15. The apparatus of claim 14 wherein the tool magazine further comprises a proximity sensor disposed proximate the tubular portion and adapted to detect the presence of the fastener tool and provide a tool detection signal to the multi-axis robot.

16. An apparatus for automatically coupling a socket to a spindle disposed on a multi-axis robot, the spindle being adapted to rotate about an axis of rotation and having a drive portion, the apparatus comprising:
a first adapter including:
a body portion having a spindle mating opening adapted to receive the drive portion; and
a first threaded portion provided on the body portion that is coaxial with the axis of rotation;
a second adapter including:
a main portion having a first surface and a second surface disposed opposite the first surface;
a second threaded portion oriented to engage the first threaded portion on the first surface and that is coaxial with the axis of rotation; and
a socket mating portion oriented to engage the socket on the second surface and is coaxial with the axis of rotation; and
a socket magazine including:
a cylindrical tubular portion having an opening for receiving the socket therein and a bottom surface; and
a surface feature provided on the bottom surface for engaging the socket to inhibit rotation;
wherein when the socket is disposed in the socket magazine proximate the surface feature the first threaded portion engages the second threaded portion when the spindle rotates about the axis of rotation in a first direction and the first threaded portion disengages the second threaded portion when the spindle rotates about the axis of rotation in an opposite direction.

17. The apparatus of claim 16 wherein the body portion has a larger diameter than the first threaded portion to inhibit tilting of the first adapter with respect to the spindle.

18. The apparatus of claim 16 wherein the main portion has a larger diameter than the socket mating portion to inhibit tilting of the socket with respect to the main portion.

19. The apparatus of claim 16 wherein the first threaded portion has a male configuration and the second threaded portion has a female configuration.

20. The apparatus of claim 16 wherein the first threaded portion has a female configuration and the second threaded portion has a male configuration.

* * * * *